United States Patent Office 3,532,401
Patented Oct. 6, 1970

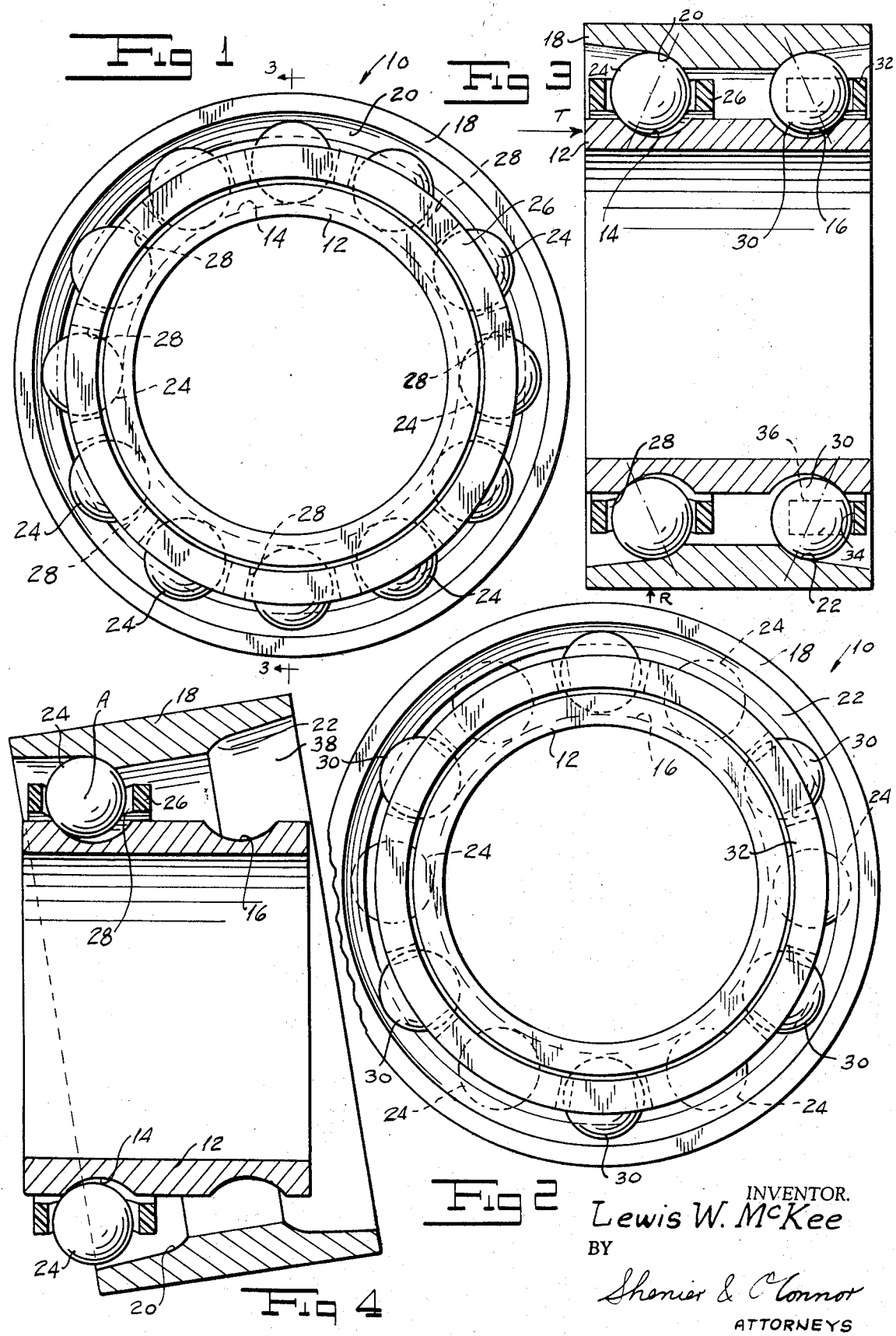

3,532,401
PRELOADED DOUBLE ROW BALL BEARING AND METHOD OF MAKING THE SAME
Lewis W. McKee, Brookfield, Conn., assignor to The Barden Corporation, Danbury, Conn., a corporation of Connecticut
Filed May 10, 1968, Ser. No. 728,149
Int. Cl. F16c *13/02*
U.S. Cl. 308—195                                  6 Claims

ABSTRACT OF THE DISCLOSURE

An internally preloaded double row ball bearing in which a large number of balls making up a first row are placed in one of two axially spaced deep groove raceways in an inner ring and in whch an outer ring having spaced angular contact raceways is slipped over the inner ring to bring one of the outer ring raceways into engagement with the balls of the first row. With the outer ring rotated around an axis passing through the center of one of the balls of the first row, a lesser number of balls making up a second row are inserted in the other inner ring raceway. As the balls of the second row are run around the rings, the balls of both rows are preloaded with a load determined by the raceway spacing and by the ball size. A snap-in retainer separates the balls of the second row. Owing to the large number of balls in the first row, the bearing has a high degree of stiffness and a high thrust capacity in one direction so that it has a high radial load capacity and a high thrust capacity in one direction while providing a lower thrust capacity in the other direction.

BACKGROUND OF THE INVENTION

In assembling rotating elements of precision instruments, the precise radial and axial position of the element and the maintenance of the position under external loads are of prime importance. Once the supporting bearing has been manufactured so as to provide the greatest possible rotational accuracy, the part played by the bearing in precisely positioning the rotating element and in imparting rigidity to the structure must be considered. Both radial and axial play inherent in the bearing affect these considerations.

Complete elimination of radial clearance in the course of manufacture of a bearing is neither feasible nor desirable. Bearings having no initial radial play have low thrust load capacity and poor axial rigidity, and are sensitive to expansion resulting from the heat of friction and thermal differentials between shafts and housings. While that is true, elimination of axial clearance in mounting the bearing is both feasible and desirable. This can be achieved by use of external means, such as shims or the like, in the mounting to preload the bearing to a point at which it permits whatever total radial or axial movement which can be tolerated.

Further in the prior art, it has been suggested to achieve these desired characteristics that preloaded bearing pairs be employed. While a preloaded bearing pair will achieve the desired results, it is a difficult and time-consuming matter to produce a precision preload. In order to achieve this result, either precise spacers or exactly mating parts must be employed. The manufacturing operations involved greatly add to the expense of producing the preloaded pair.

I have invented an internally preloaded double row ball bearing which overcomes the defects of preloaded bearings of the prior art. My bearing has a high degree of stiffness and a high thrust capacity in one direction. My internally preloaded double row ball bearing does not involve the time-consuming, expensive and difficult assembly operations of the prior art. I have provided a method of assembling my internally preloaded double row ball bearing in a rapid and expeditious manner.

SUMMARY OF THE INVENTION

One object of my invention is to provide an internally preloaded double row ball bearing having a high load capacity.

Another object of my invention is to provide an internally preloaded double row ball bearing which does not involve the difficult assembly operations of preloaded bearing pairs of the prior art.

A further object of my invention is to provide a method of assembling an internally preloaded double row ball bearing in a rapid and expeditious manner.

Other and further objects of my invention will appear from the following description.

In general my invention contemplates the provision of an internally preloaded double row ball bearing in which I first place a large number of balls in one deep groove raceway of an inner ring having two axially-spaced deep groove raceways and then slip an outer ring having angular contact raceways over the ring to bring one of the outer ring raceways into engagement with the balls of the first set. I next rotate the outer ring around an axis passing through the center of one of the balls and insert the lesser number of balls of a second set in the other inner ring raceway. As I move these balls around the raceways, an internal preload is applied to the assembly. Finally, I apply a snap-in ball separator or cage to the balls of the second set to hold them in properly spaced relationship.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a side elevation of my internally preloaded double row ball bearing viewed from one side thereof.

FIG. 2 is a side elevation of my internally preloaded double row ball bearing from the other side thereof.

FIG. 3 is a sectional view of my internally preloaded double row ball bearing taken along the line 3—3 of FIG. 1.

FIG. 4 is a sectional view of my internally preloaded double row ball bearing illustrating one step in my method of assembly thereof.

DESCRIPTION OF THE PREFERRED EMBODIMENT

My internally preloaded double row ball bearing, indicated generally by the reference character 10, includes an inner ring 12 provided with spaced deep groove raceways 14 and 16 having a predetermined spacing therebetween. The outer ring 18 has spaced angular contact raceways 20 and 22, the outer shoulder of which have been removed in a manner known to the art. Raceways 20 and 22 also have a predetermined spacing so related to the spacing of raceways 14 and 16 and to ball size as to provide the desired preload. In the finished assembly, raceways 14 and 20 receive the balls 24 of a set of balls including a relatively large number. Preferably, I provide the balls of the first set with a cage 26 having spaced pockets 28, each of which receives a ball 24.

My bearing 10 includes a second set of balls 30 located between raceways 16 and 22. As will be explained hereinafter, there are fewer balls 30 of the second set than there are balls 24 of the first set. I provide a ball separator 32 of the snap-in type for holding the balls 30 in spaced relationship around the raceways 16 and 22. The retainer 32 may be of any suitable type. For example, it may be of the type which is formed from an annular body by first drilling radial holes and then cutting the body in a direction perpendicular to the axis of the annulus to open up the drilled holes to provide ball recesses 34 separated by arms 36. As is known in the art, in assembling the separator 32 with the balls 30, each arm 36 snaps into the space between two of the balls 30 so that the separator 32 is held assembled by the balls. Alternatively, I might employ a snap-in ball separator of the type shown in my copending application, Ser. No. 721,669, filed April 16, 1968.

In my method of assemblying the bearing 10, I first assemble a plurality of balls 24 of the first set in a cage 26 and place the balls in the raceway 14. It is to be understood that, alternatively to using the cage 26, I may hold the balls in a suitable fixture and provide a final assembly wherein no cage is employed.

With the balls 24 of the first set thus positioned in the raceway 14, I next slip the ring 18 over the ring 12 so as to bring the raceways 20 into operative relationship with the set of balls 24. When that has been done, I next tilt ring 18 around an axis, such as the axis A, passing through the center of one of the balls 24 to open up a space, indicated generally by the reference character 38, between the rings 12 and 18 at the upper righthand side thereof as viewed in FIG. 4. I then insert the balls 30 of the second set into the space 38. It will readily be appreciated that I cannot fit as many balls 30 into this space as there are balls 24 of the first set.

When the balls 30 have been inserted into the space 38, I run them around the raceway 16 and return ring 18 to the position shown in FIG. 3. In the course of this operation, owing to the relationship of the spacing between raceways 14 and 16 to the spacing between raceways 20 and 22, the bearings will contact the raceways at points through which the dot-dash lines shown on the balls in FIG. 3 pass. In the course of this operation, the bearing is given a predetermined load. The load is determined by the relationship of the spacing between the raceways of the inner ring to the spacing between the raceways of the outer ring and by the size of the balls. Finally, in order to retain the spacing of the balls 30 of the second set, I insert the snap-in retainer so as to position one of its arms 36 between each set of adjacent balls 30.

As has been explained hereinabove, I provide a very large number of balls 24 in the first row of balls. As compared to the number of balls in an ordinary deep groove bearing, I may provide half again as many balls 24 in the first row of my bearing. Owing to the fact that there are a large number of balls in the first row, my bearing is relatively stiff so as to have a high load capacity in a radial direction, indicated by the arrow R, and also a high thrust capacity in the direction of the arrow T.

As will also be apparent from the description hereinabove, of necessity I cannot have as many balls 30 in the second set of balls as there are balls 24. In the particular example shown in the drawings, there are only half as many balls 30 as theer are balls 24. Nevertheless, the bearing will have some thrust capacity in a direction opposite to the direction of the arrow T. It will readily be appreciated that in most installations the thrust force is principally in only one direction. Consequently, the bearing is so installed as to cause that thrust to be in the direction of the arrow T in FIG. 3.

To summarize, in assembling my bearing 10 I place a very large number of balls 24 in the raceway 14 and bring the outer ring raceway 20 into operative relationship with the balls. I next tilt the outer ring with reference to the inner ring around the axis A and insert the balls 30. I then space balls 30 around the rings and insert the separator 32 to hold these balls in position. Under these conditions, a predetermined internal load is built into the bearing which will have a high load capacity in the direction of the arrows R and T.

It will be seen that I have accomplished the objects of my invention. I have provided an internally preloaded double row ball bearing which avoids the precise complex machining operations necessary in the prior art to produce a preloaded pair. My bearing is provided with one row of balls containing a very large number of balls so that it has a higher load capacity both in a radial direction and in one thrust direction. I have provided a method of assembling my internally preloaded double row ball bearing in a rapid and expeditious manner.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having this described by invention, what I claim is:

1. A ball bearing including in combination unitary inner bearing ring formed with two axially spaced raceways, a unitary outer bearing ring formed with two axially spaced raceways, said rings being substantially the same width, the raceways of the inner ring and outer rings providing first and second pairs of coacting raceways, the raceways of one of said rings being deep groove raceways, each of said deep groove raceways having continuous outer and inner shoulders around the edges thereof, the raceways of the other ring being angular contact raceways, each of said angular contact raceways having the outer shoulder thereof removed to provide an interrupted annular surface extending axially continuously from the outer edge of the ring into the raceway, a first set of balls disposed in the raceways of the first pair, the number of balls in said first set approaching a full complement of balls, a second set of balls in the raceways of the second pair and the spacing of the raceways are so related as to preload the bearing.

2. A ball bearing as in claim 1 in which the number of balls in the second set is appreciably less than a full complement.

3. A ball bearing as in claim 1 in which the raceways of the inner ring are deep groove raceways and in which the raceways of the outer ring are angular contact raceways.

4. A ball bearing as in claim 1 including a ball cage for holding the balls of the first set.

5. A ball bearing as in claim 1 including a snap-in ball separator for holding the balls of the second set in spaced relationship to each other.

6. A ball bearing as in claim 1 in which the number of balls in the second set is about half the number of balls in the first set.

References Cited

UNITED STATES PATENTS

| 1,146,271 | 7/1915 | Mossig et al. | 308—195 |
| 1,496,516 | 6/1924 | Betz | 308—201 |
| 1,150,844 | 8/1915 | Wingquist | 308—194 |

FRED C. MATTERN, JR., Primary Examiner

F. SUSKO, Assistant Examiner

PO-1050
(5/69)

UNITED STATES PATENT OFFICE
CERTIFICATE OF CORRECTION

Patent No. 3,532,401      Dated October 6, 1970

Inventor(s) Lewis W. McKee

It is certified that error appears in the above-identified patent and that said Letters Patent are hereby corrected as shown below:

Column 4, line 26:
    "this" should be -- thus -- .
    "by" should be -- my -- .

Column 4, line 27:
    After "combination" insert -- a -- .

Column 4, line 31:
    Delete "ring".

Column 4, line 38:
    "interrupted" should be -- uninterrupted -- .

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents